April 30, 1935.  H. A. BORRESEN  1,999,683
HOSE CLAMP
Filed Dec. 1, 1933  2 Sheets-Sheet 1
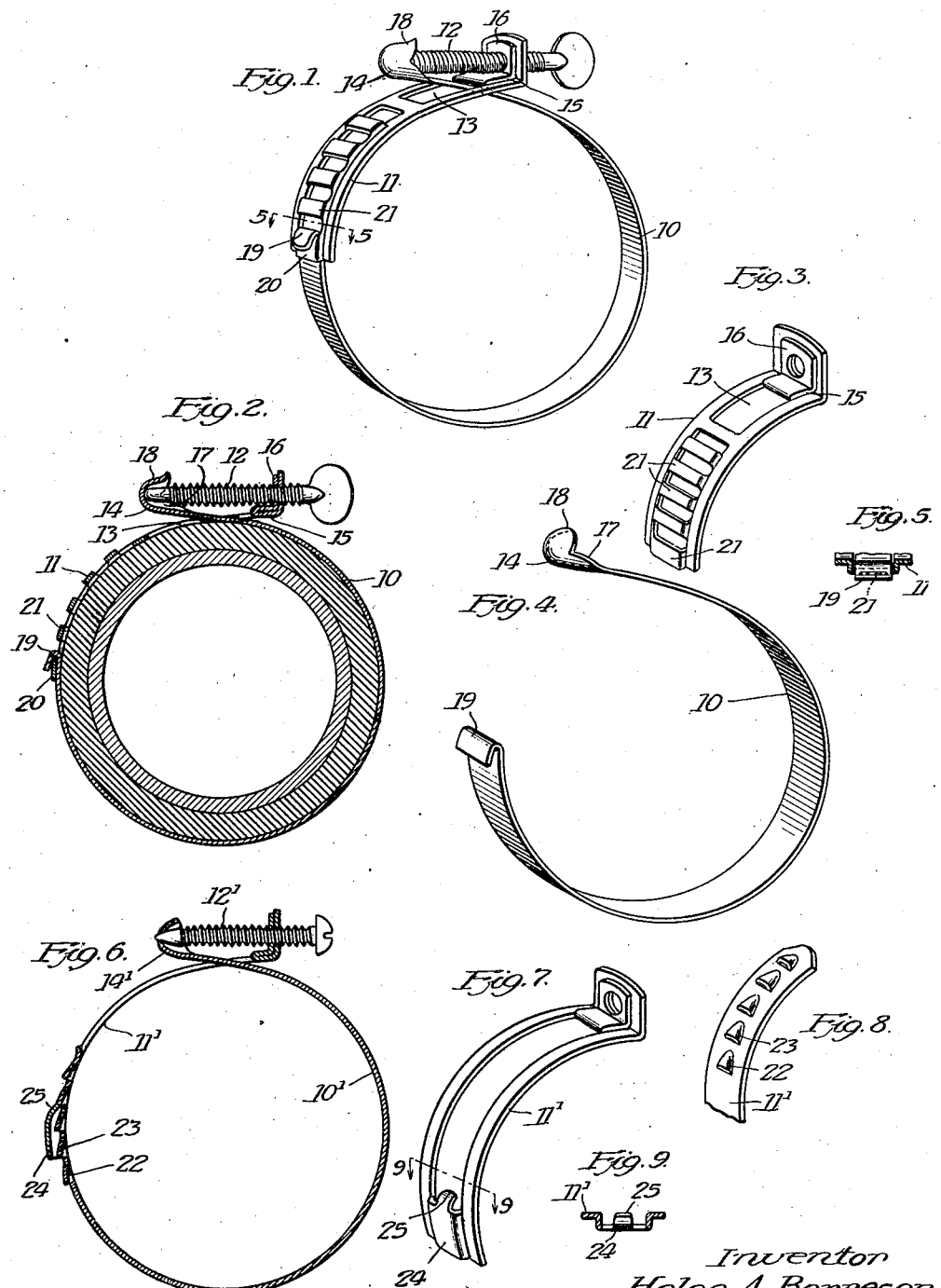
Witness
Martin H. Olsen
Inventor
Helge A. Borresen
By Zabel & Wells, Atty April 30, 1935. H. A. BORRESEN 1,999,683
HOSE CLAMP
Filed Dec. 1, 1933 2 Sheets-Sheet 2
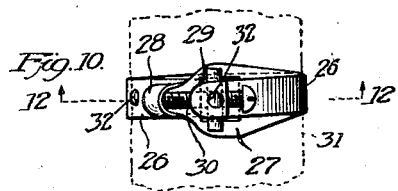
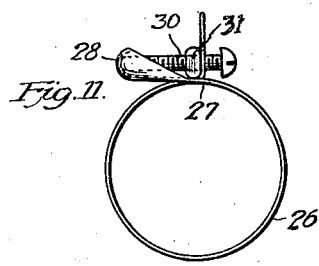
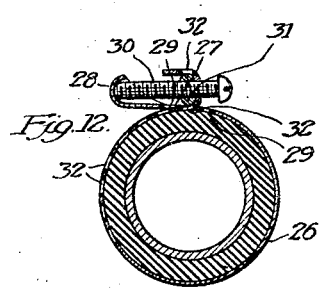
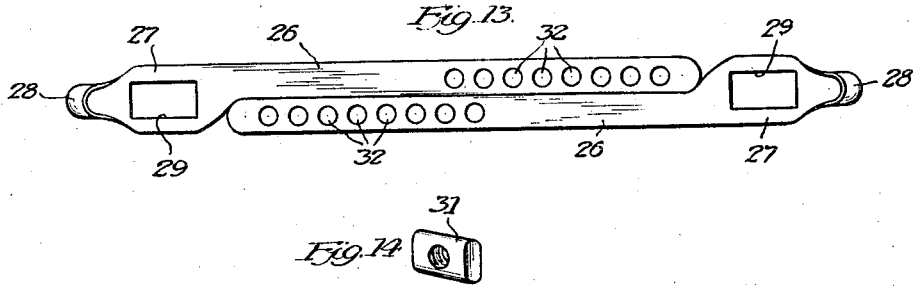
Inventor
Helge A. Borresen
By Zabel & Wells Attys.
Witness
Martin H. Olsen Patented Apr. 30, 1935

1,999,683

UNITED STATES PATENT OFFICE 1,999,683

HOSE CLAMP

Helge A. Borresen, Chicago, Ill.

Application December 1, 1933, Serial No. 700,462

8 Claims. (Cl. 24—19)

My invention relates to hose clamps and has as its principal object the provision of a hose clamp which will clamp the hose uniformly throughout the circumference thereof.

It is also a purpose of my invention to provide a clamp of this character which can be adjusted as to size without destroying its ability to clamp the hose tightly at all points.

My invention contemplates also the provision of a clamp constructed of sheet metal with the exception of the adjusting screw in which the metal is so formed as to properly reenforce those portions of the clamp where extra strength is needed by taking the metal from other points where the strength is not needed.

I will describe the preferred form of my invention by reference to the accompanying drawings. It is to be understood however that the drawings and descriptions are illustrative only and are not to be taken as limiting the invention except insofar as it is limited by the claims.

In the drawings—

Fig. 1 is a perspective view of the clamp;

Fig. 2 is a sectional view through a hose with my clamp applied thereto;

Fig. 3 is an enlarged perspective of a portion of the clamp;

Fig. 4 is a view similar to Fig. 3 of the other section of the clamp that cooperates with that section shown in Fig. 3;

Fig. 5 is a section on the line 5—5 of Fig. 1;

Fig. 6 is a sectional view showing a slightly different type of clamp;

Figs. 7 and 8 are perspectives of the two interlocking portions of the clamp shown in Fig. 6;

Fig. 9 is a section on the line 9—9 of Fig. 7;

Fig. 10 illustrates a modified form of clamp;

Fig. 11 is a side view of the clamp shown in Fig. 10;

Fig. 12 is a section on the line 12—12 of Fig. 10;

Fig. 13 is a plan view showing how two clamps are made from a single strip of metal;

Fig. 14 is a perspective of the screw-threaded member used.

Referring now in detail to the drawings, the clamp is made up of two pieces 10 and 11 of sheet metal and adjusting bolt or screw 12. It is evident from the drawings that the two sections overlap, that is, the part 10 passes through the opening 13 of the part 11 and the screw 12 spreads the ends 14 and 15 of the parts 10 and 11 respectively so as to tighten the clamp on the hose.

The end 15 of the member 11 is adapted to support the screw 12 and is turned up as indicated in Fig. 3, also the reenforcing portion 16 which is taken out of the strip to leave opening 13 aids in bracing the portion of the clamp subject to the greatest strain, namely the upturned portion 15. Portions 15 and 16 are, of course, screw threaded to receive the screw 12.

The end 14 of the piece 10 is drawn up to form a pocket for receiving the end of the screw 12. As shown most clearly by Figs. 2 and 4, this portion 14 is formed by drawing up the sides as indicated at 17 and cupping over the end 18 of the metal. This structure is sufficiently strong to prevent straightening out of the end 14 under the pressure from the screw 12.

As shown in Fig. 2, the tendency of the screw in spreading the ends 14 and 15 away from each other is to press them in toward the hose and thus clamp the hose just as tightly where 10 and 11 cross each other as at any other point.

The portions 10 and 11 are adjustably hooked together at their other ends by means of the hook 19 and the cross-bars such as 20 and 21. Cross-bars 20 and 21 are elevated or pressed out from the member 11 a distance sufficient to allow the thickness of the member 10 between them and the hose. In this way no loss of pressure on the hose where the two pieces hook together is allowed.

Referring now to Figs. 6 to 9 inclusive, the portions 10' and 11' are quite similar to the portions 10 and 11 in Figs. 1 to 5. The screw 12' operates to tighten the clamp the same as in the first form with the exception that the tube of the screw 12' passes through the portion 14' slightly as shown in Fig. 6.

The manner of connecting the portions 10' and 11' together for adjusting the length of the clamp is, however, somewhat different. The end of the member 10' has struck up therefrom the cone shaped portions such as 22 and 23. Then on the portion 11', the bridge 24 which is raised to permit the passage of 10' therebeneath has a downturned hook or tongue 25 to engage against the faces of the portions 22 and 23.

In the form of the invention shown in Figs. 10-14, inclusive, a cross-over clamp is also obtained, but this is a one-strap clamp having a wide range of adjustment.

In this form of the invention, the strap 26 has an enlarged or wide end 27 substantially double the width of the remaining portion of the strap. This wide end is cupped up at 28 in a manner similar to the cupping of the end 14 of the form shown in Figs. 1-9. The end 27 is also apertured at 29 to permit the other end of the strap to pass through it thus assuring a full grip all around the hose. The strap is provided with a series of apertures 32 extending from the small end toward the enlarged end for giving a wide range of adjustment.

The screw 30 is passed through one of the apertures 32 and through the threaded nut 31. The point of the screw which is rounded is seated in the cupped end 28, and, by turning this screw, the two ends of the clamp may be spread apart to draw it down on the hose. The rounded edges of the nut 31 prevents cutting of the strap where it is bent over this nut thus utilizing all the available tensile strength of the strap.

In Fig. 13, I have shown two clamps side by side to illustrate how a single strip of material can be cut to make two clamps with practically no loss of material. This enables me to produce the clamps with practically no waste thereby reducing the ultimate cost of the clamp. The lateral offsetting of the wide end of the strap does not cause any difficulty. In fact, it causes one side edge of the clamp to tend to hug the hose closely and thus is an advantage. The method of cutting two clamps from a single strip not only eliminates waste, but it makes it possible to produce two clamps with no more operations of the press and no more labor than is required to produce one clamp thus saving machinery, time, and labor. The nut 31 being elongated bears on the wide part of the clamp which strengthens the clamp further.

It will be noted that the nut 31 rests directly on the line of cross-over between the two ends of the clamp. The nut assumes this position naturally in tightening the clamp and by pressing down on the three contact points of the clamp with the hose (see Fig. 10), as it does when the clamp is tightened, the nut further insures against leakage at the line where the two ends of the clamp cross each other which is the critical point of leakage. The aperture 29 is elongated sufficiently to allow a substantial adjustment by means of the screw.

From the above description, it is believed that the construction and advantages of this device will be clearly apparent to those skilled in this art.

Having thus described my invention, what I claim as new and desire to secure by Letters Patent is:

1. A hose clamp of sheet metal having one end portion provided with an opening through which the other end portion passes, the free end beyond said opening being turned up and screw threaded to receive a tightening screw, the other free end being cupped to receive the end of the screw, said turned up free end being reenforced by the material taken from said opening.

2. A hose clamp made up of two metal strips and a tightening screw, one of said strips being wider than the other and having one end turned up, said strip also having a portion of the material adjacent the end struck up and doubled over upon the turned up end to reenforce it, said other strip having one end passing through the opening from which the reenforcing material was struck up and cupped to receive the end of the screw, the turned up end and its reenforcement being screw threaded to receive the screw the other ends of said strips being hooked together.

3. A hose clamp made up of two metal strips and a tightening screw, one of said strips being wider than the other and having one end turned up, said strip also having a portion of the material adjacent the end struck up and doubled over upon the turned up end to reenforce it, said other strip having one end passing through the opening from which the reenforcing material was struck up and cupped to receive the end of the screw, the turned up end and its reenforcement being screw threaded to receive the screw, the wider strip being apertured to provide a transverse securing portion adjacent its other end, which portion is raised intermediate the side edges of the strip high enough and wide enough for the cooperating end of the narrow strip to fit therein, said cooperating end having a hook for engaging said securing portion.

4. A hose clamp having a pair of sheet metal strips hooked together at one end and crossing each other at their other ends, a spreader screw connected to the crossed ends for spreading them, the hose gripping surfaces of said strips being the same in curvature where they hook together as at all other points around the hose to provide a uniform grip of the hose, one strip being wider than the other and apertured at its end remote from the screw to provide a plurality of transverse securing portions which are raised above the hose gripping side edges for the height and width of the narrower strip, said narrower strip having an out-turned hook to hook over any selected one of said securing portions.

5. A hose clamp of sheet metal having one end portion provided with an opening through which the other end portion passes, one end portion being cupped to receive the end of a screw, and the other end portion being apertured for receiving said screw and having screw-threaded means thereon to provide for tightening the clamp, the cupped end of said clamp being widened to provide for said opening, and the narrow end of said clamp being apertured at a plurality of places to provide adjustment of the clamp to different sizes of hose.

6. A hose clamp of sheet metal having one end portion provided with an opening through which the other end portion passes, one end portion being cupped to receive the end of a screw, and the other end portion being apertured for receiving said screw and having screw-threaded means thereon to provide for tightening the clamp, the cupped end of said clamp being widened to provide for said opening, one side edge of said widened portion being aligned with the remainder of the clamp so that the widened portion is all at one side, the widened portion being substantially double the width of the other portion.

7. A hose clamp made from a strip of sheet metal, said clamp having an end portion the width of the strip and the remainder thereof half the width of the strip, the wide end portion being cupped to receive the end of a screw and the clamp being straight along one edge from the cupped portion to the other end, whereby waste of material from the strip is practically eliminated and the cutting operations for making two clamps are reduced to a minimum.

8. A hose clamp of sheet metal having one end portion provided with an opening through which the other end portion passes, one end portion being cupped to receive the end of a screw, and the other end portion being apertured for receiving said screw and having screw-threaded means thereon to provide for tightening the clamp, said screw-threaded means comprising a nut rounded on the face engaged by the clamp said nut engaging both end portions of the clamp where they cross each other thereby pressing them against the hose at their cross-over line.

HELGE A. BORRESEN.